INVENTOR
RICHARD O. TRAINA
BY *Harry G. Shapiro*
ATTORNEY

INVENTOR
RICHARD O. TRAINA

United States Patent Office 3,445,683
Patented May 20, 1969

3,445,683
SOLID-STATE RELAY
Richard O. Traina, Newark, N.J., assignor, by mesne assignments, to Plessey Airborne Corporation, Hillside, N.J., a corporation of New Jersey
Filed Mar. 8, 1965, Ser. No. 437,965
Int. Cl. H03k 17/60
U.S. Cl. 307—252     26 Claims

ABSTRACT OF THE DISCLOSURE

The disclosed solid-state relay apparatus incorporates a setpoint level adjustment circuit for adding an adjustable DC reference potential to an amplified signal and applying the sum to a trigger circuit, which may have DC, AC, or mechanical relay output circuits. The disclosure is also concerned with temperature-compensated, stabilized DC amplification, trigger circuit hysteresis control, unijunction oscillator-SCR controlled output circuits, and with time-proportioning of output circuit states.

---

This invention relates to a solid-state relay and more particularly to a sensitive, stable, adjustable relay which may be actuated by a thermocouple or other appropriate signal source.

The ability of solid-state relays to withstand shock and vibration and the potential long life of such devices are well recognized. Prior solid-state relays have employed expensive magnetic amplifiers in an effort to provide devices which are responsive to low input power levels, are capable of handling large AC loads, have readily variable sensitivity, operate stably over a wide temperature range, provide isolation of load and control circuits, provide fast switching, are versatile, and which have other advantages. In practice, however, it has been difficult to achieve these ends without unduly increasing the expense and complexity of the apparatus.

It is accordingly a principal object of the present invention to provide an improved solid-state relay.

Another object of the invention is to provide a solid-state relay having exceptionally versatility, stability, and sensitivity.

A further object of the invention is to provide a solid-state relay having a readily adjustable setpoint, having fast and positive switching action, and capable of handling a wide range of AC or DC loads with complete isolation from the relay circuitry.

An additional object of the invention is to provide a solid-state relay or the like which has a time proportioning output, i.e., an output which has adjustable ON-OFF time.

Still another object of the invention is to provide improved component circuits for use in relays of the foregoing type and elsewhere.

Briefly stated, in accordance with a broad concept of the present invention a solid-state relay is provided in which a low level control signal is fed to a sensitive, stable DC amplifier. The output of the amplifier, an amplified replica of the control signal, is applied to a setpoint level adjustment circuit, which adds an adjustable DC reference. The sum signal is applied to the input of a bistable trigger circuit, which may control a variety of output circuits. A typical output circuit may comprise a multiple-switch mechanical relay, or an AC switching circuit electrically isolated from the trigger circuit, or a DC switching circuit electrically isolated from the trigger circuit. The sum signal may also have a time-dependent component, which provides ON-OFF time proportioning.

The foregoing and other objects, advantages, and features of the invention and the manner in which the same are accomplished will become more readily apparent upon consideration of the following detail description of the invention taken in conjunction with the accompanying drawings, which illustrate preferred and exemplary embodiments, and wherein:

Figure 1:
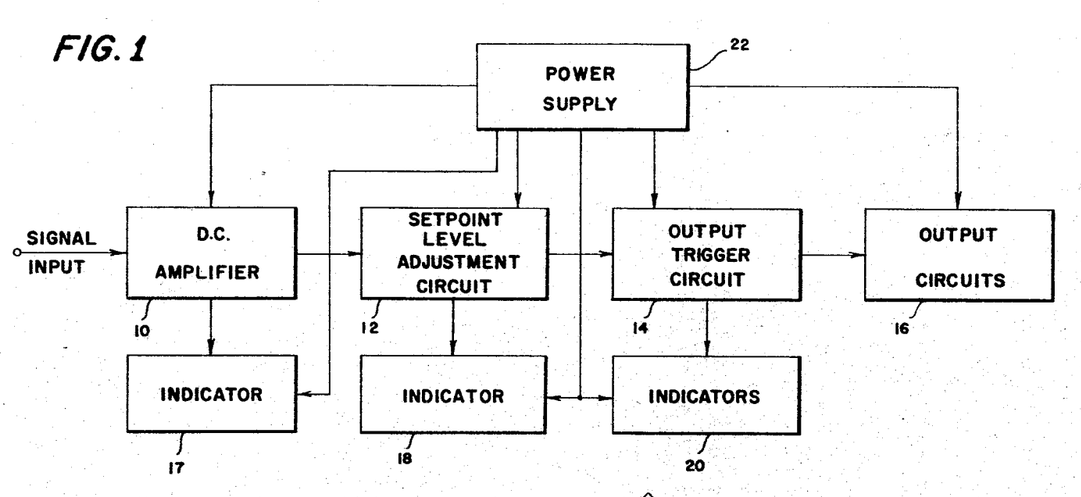
FIGURE 1 is a block diagram of a relay of the invention.

Referring to the drawings, and initially to FIGURE 1, a signal, such as the output of a thermocouple, is applied to the input of a DC amplifier 10, which provides at its output an amplified replica of the signal for application to a setpoint level adjustment circuit 12. The circuit determines the level of signal required to trip the relay and adds a DC reference to form a sum signal which is applied to an output trigger circuit 14. This circuit is bistable, providing alternate outputs which may be utilized to control the operation of a variety of output circuits 16. Indicator 17 is provided to indicate the amplified signal, and indicator 18 to indicate the difference between the sum signal and the level at which the trigger circuit operates. Indicators 20 designate the state of the trigger circuit 14. A power supply 22 provides electric power for the component circuits of the invention.

Figure 2:
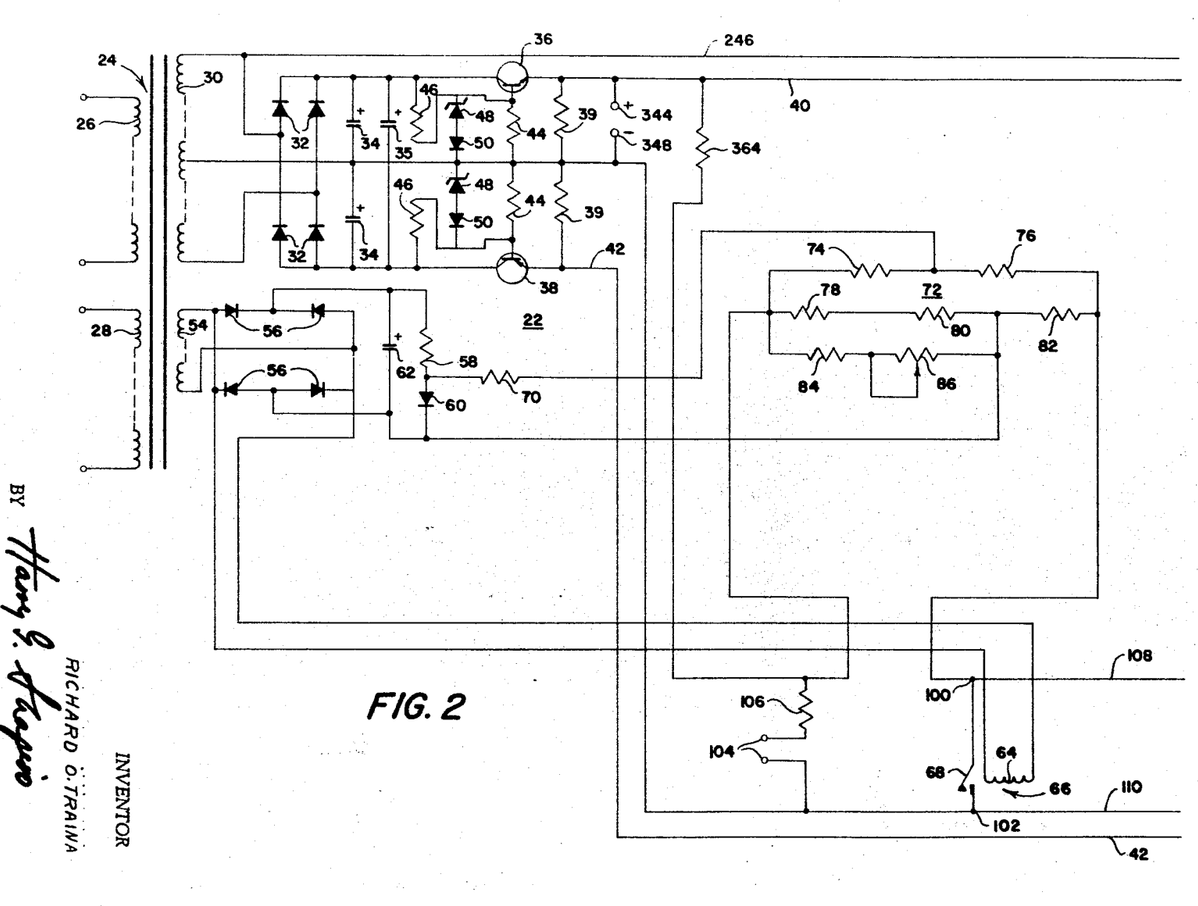
FIGURE 2 is a schematic diagram of a power supply, chopper, and compensating network employed in the invention.

Referring to FIGURE 2, the power supply 22 comprises a power transformer 24 having dual primary windings 26 and 28 for connection to appropriate sources of AC, such as 115 volts and 220 volts, respectively, at a frequency within the range of 50 to 440 cycles per second, for example. Secondary winding 30 of the power transformer, which may be a 35 volt secondary, supplies AC to a diode bridge comprising rectifiers 32, the output of which is filtered by capacitors 34 and 35. Complementary transistors 36 and 38 have their collector-emitter paths in series with output conductors 40 and 42 of the rectifier bridge. The base of each transistor is connected to the center tap of secondary winding 30 by a resistor 44. Each base is also connected to the associated collector by a resistor 46 and is connected to the center tap by a Zener diode 48 in series with the temperature-compensating diode 50. The Zener diodes serve as regulators to provide a reference voltage, while the series pass transistors 36 and 38 are the control elements which absorb any fluctuations in the input voltage and respond to varying current demands from the load by either increasing or decreasing their IR drop. The center tap of winding 30 is connected to an output conductor 110, which serves as the neutral line of the plus, neutral, minus voltage system. This line requires no control element, and each half of the voltage supply system is independent of the other.

Secondary winding 54 of the power transformer, which may be a 6.3 volt secondary, provides AC for a diode bridge comprising rectifiers 56. The output of the bridge is applied to a resistor 58 and a forward biased diode 60 in series, which are shunted by a filter capacitor 62. The voltage across diode 60 is relatively independent of input fluctuations. Secondary 54 also drives the coil 64 of a mechanical chopper 66 having contacts 68.

The output across diode 60 is connected through a resistor 70 to a bridge 72, which provides ambient temperature compensation and also provides a basic 5 millivolts, for example, to make up the amplifier deadband. The bridge comprises resistors 74, 76, 78, 80, 82, 84, and 86. Resistor 86 is adjustable, and resistor 80 is formed of iron wire and situated where it is exposed to the external ambient temperature in order to provide thermocouple cold junction compensation. The iron resistor causes the bridge output to vary in response to ambient temperature changes in order to add or subtract sufficient millivoltage from the signal to maintain the cold junction reference millivoltage at a zero degree Fahrenheit point, for example.

Figure 2A:
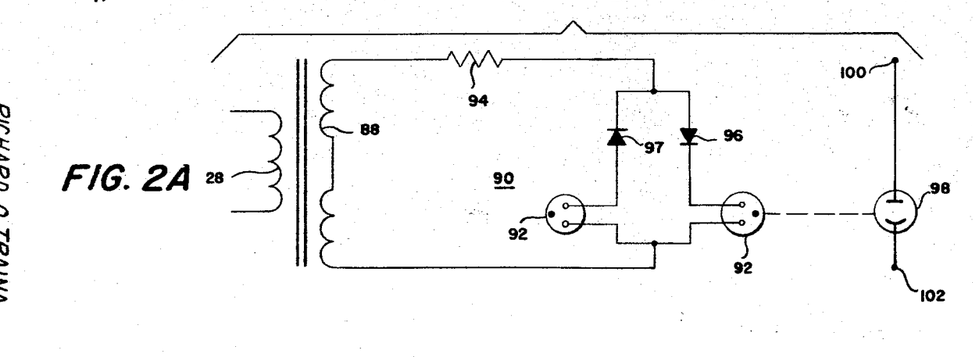
FIGURE 2A is a schematic diagram of a modified form of chopper.

As shown in FIGURE 2A, an additional secondary winding 88 may be utilized to energize an alternative chopper 90 comprising neon bulbs 92 in series with a resistor 94 and oppositely poled diodes 96 and 97. Light from the neon bulbs, which are lit during portions of alternate half cycles of the AC supply, is directed upon a photo-conductive device 98, which may comprise a pair of cadmium selenide cells. The photo-conductive device alternately presents a high and low impedance across points 100 and 102, which are also shown in FIGURE 2 to locate the connection points for the photo-sensitive device.

Signal input terminals 104 (FIGURE 2), which may be connected to the output of a thermocouple, for example, are connected through resistor 106 in series with bridge 72 across conductors 108 and 110, which constitute the input leads of the amplifier. The algebraic sum of the input signal and the compensating voltage of the bridge 72 is chopped by the chopper. The resultant signal is a millivoltage represented by a square wave entirely on the positive side of the zero axis and is applied to an amplifier alignment network (FIGURE 3) comprising a fixed resistor 112 and a variable resistor 114 in series. The alignment network serves to trim out the differences in the gains of the individual transistors used in the amplifier and stabilizes the gain of the amplifier at a value of 42 db, for example, so that 24 millivolts input gives 2.75 volts DC at the output of the amplifier, for example.

Figure 3:
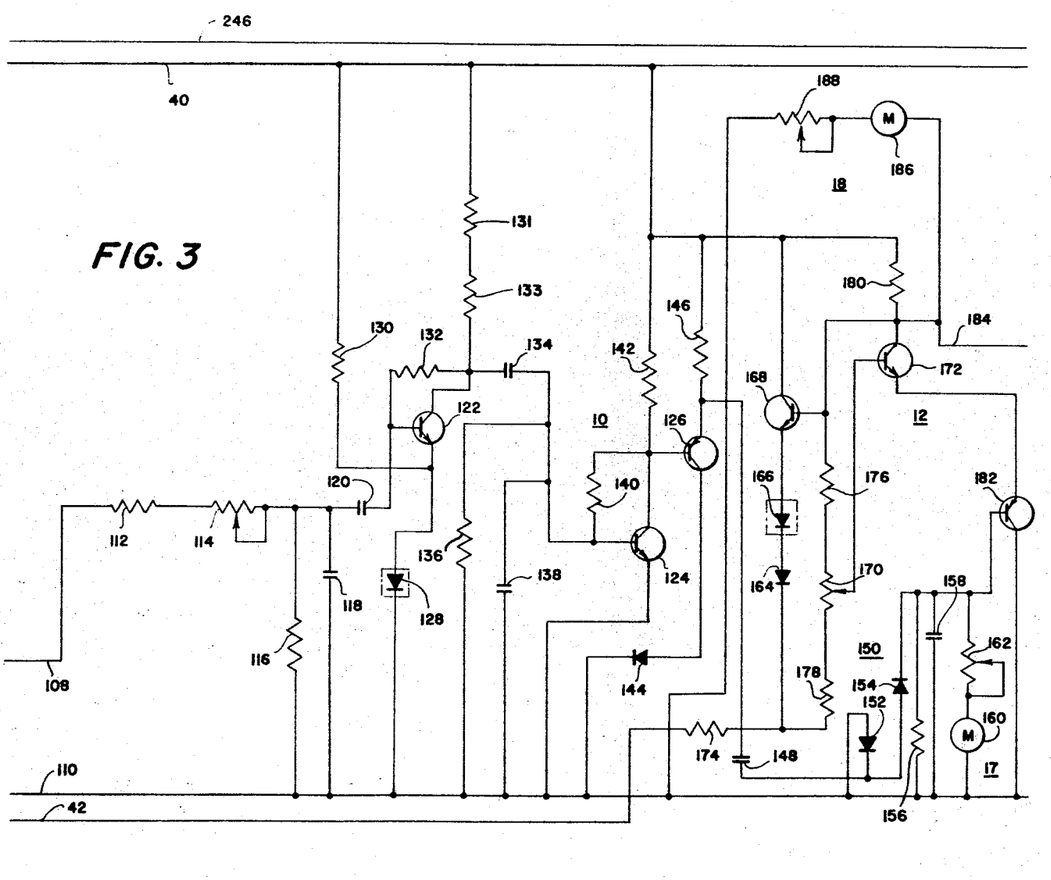
FIGURE 3 is a schematic diagram of amplifier, demodulator, setpoint level adjustment, and indicator circuits employed in the invention.

From the alignment network the signal passes to a centralizer network comprising resistor 116 and condenser 118 connected across conductors 108 and 110 and series condenser 120. The centralizer network transforms the signal to a zero-centered square wave. This completes the modulation and conditioning of the signal.

Amplifier 10 is a three-stage amplifier in which the third stage is a buffer stage which does not add to the gain but prevents the output from excessively loading the amplifier's active stages. The first two stages comprise NPN transistors 122 and 124, and the third stage comprises PNP transistor 126. The first stage is a bootstrapped common emitter stage, which has its emitter potential raised by a silicon stabistor 128 to a value of 1.70 volts DC nominal, for example. The stabistor is a unitary device comprising three diodes with the same polarity in series and encapsulated so as to be physically integral. The stabistor is forward biased by a resistor 130 connected between conductor 40 and the emitter of transistor 122. A bias resistor 132 is connected between the collector and the base of the transistor, and the collector is connected by resistors 131 and 133 to conductor 40 and by capacitor 134 to the base of transistor 124. Condenser 134 is preferably a tantalum capacitor, which provides noise suppression and ambient temperature compensation, and which stabilizes the amplifier. Resistor 136 and capacitor 138 are connected in parallel between the base and the emitter of transistor 124. A bias resistor 140 is connected between the collector and the base of the transistor. The collector is connected by resistor 142 to conductor 40 and also directly to the base of transistor 126. The collector of transistor 126 is connected by a diode 144 to conductor 110. The emitter is connected by a resistor 146 to conductor 40 and by a capacitor 148 to a demodulator circuit 150.

The demodulator comprises a first diode 152 having its anode connected to conductor 110 and its cathode connected to capacitor 148 and to the anode of a second diode 154. A resistor 156 and a capacitor 158 are connected in parallel between the cathode of diode 154 and conductor 110. Diode 152 serves to provide continuity for the signal passed by condenser 148 and avoids the need for a second set of chopper contacts for demodulation. Diode 154, resistor 156, and capacitor 158 form a half-wave rectifier and filter. The demodulator rectifies and filters the square wave from the amplifier and returns it to a pure DC state. The output of the demodulator should be as close a replica of the input signal of the amplifier as possible. For this reason a tantalum filter capacitor 158 is preferably employed.

The output of the demodulator may drive indicator 17 comprising a meter 160 connected in series with a variable resistor 162. The deflection of the meter is directly proportional to the signal at the output of the demodulator, and the meter can be linearly calibrated to read the units of the input signal to the amplifier in millivolts or temperature degrees directly.

The output of the demodulator is fed to the setpoint level adjustment circuit 12, which serves to establish the setpoint without affecting amplifier gain. In this circuit the regulated voltage across a diode 164, a three junction stabistor 166, and the base-emitter junction of NPN transistor 168 is divided by the setpoint potentiometer 170, and a portion of this voltage is applied in a series connection through NPN transistor 172. The collector of transistor 168 is connected to conductor 40, and the cathode of diode 164 is connected through resistor 174 to conductor 42. Potentiometer 170 is part of a voltage divider network comprising the potentiometer and resistors 176 and 178 in series between the base of transistor 168 and the cathode of diode 164. The base of transistor 168 is connected to the collector of transistor 172, which is connected through a resistor 180 to conductor 40. The base of transistor 172 is connected to the tap of potentiometer 170, while the emitter of transistor 172 is connected to the emitter of a complementary (PNP) transistor 182, the base of which is connected to the output of the demodulator, and the collector of which is connected to conductor 110.

The output at the collector of transistor 172 represents the algebraic sum of the reference potential obtained from the potentiometer 170 and the signal obtained from the output of the demodulator. The sum signal is applied to conductor 184 connected to the input of the trigger circuit 14 but has no effect on the state of the trigger circuit until it reaches a predetermined trigger point of, for example, 4.0 volts DC. An important aspect of the setpoint level adjustment circuit is that the circuit does not amplify or attenuate the signal. It merely adds the signal to a reference potential.

The output of the level adjustment circuit drives indicator 18, comprising a differential meter 186 connected in series with an adjustable resistor 188 between the collector of transistor 172 and conductor 110. The scale of meter 186 is inscribed with zero at the deflection point corresponding to 4.0 volts DC, the trigger point of the trigger circuit. The deflection of the meter above or below the zero indication is proportional to the difference of the sum signal and the trigger point.

Figure 4:
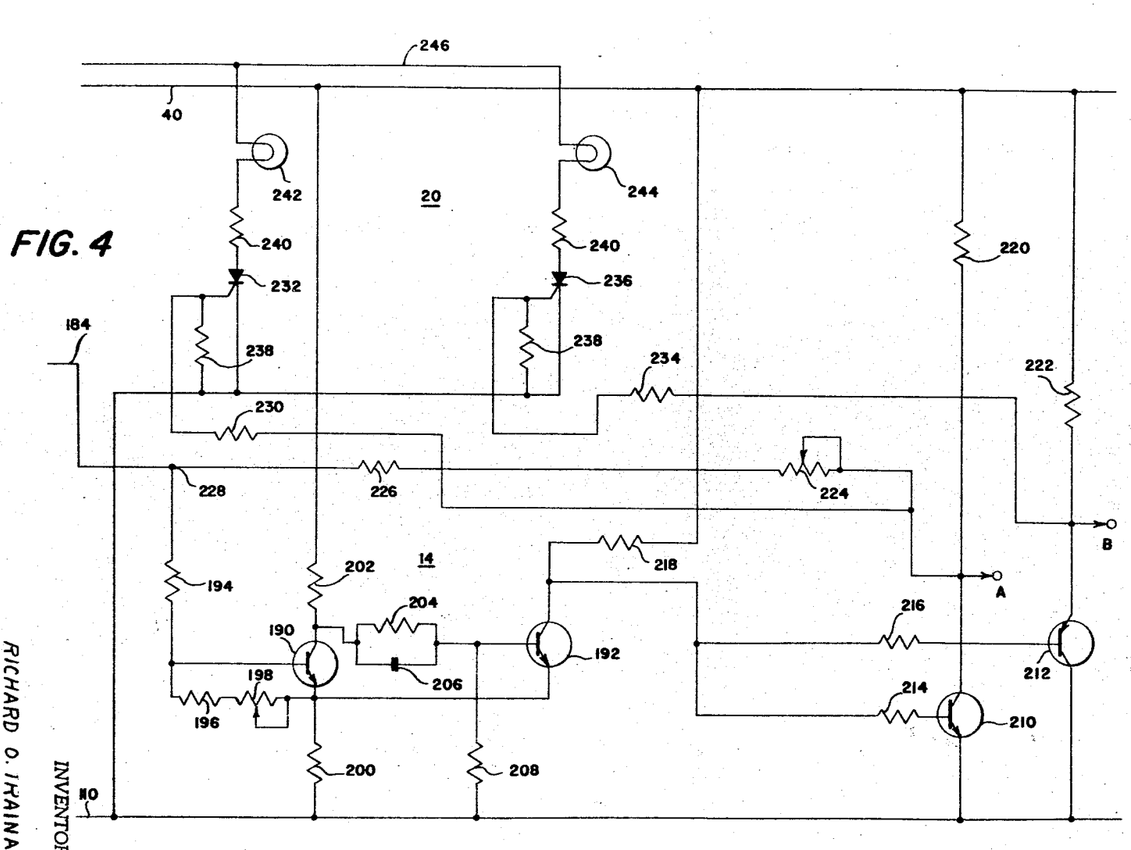
FIGURE 4 is a schematic diagram of trigger and indicator circuits employed in the invention.

Referring to FIGURE 4, the trigger circuit 14 is a snap acting circuit with complementary outputs and employs feedback to reduce the hysteresis. NPN transistors 190 and 192 form the basic trigger. Conductor 184 is connected by resistor 194 to the base of transistor 190, which is also connected through a fixed resistor 196 and a variable resistor 198 to its emitter. The emitters of transistors 190 and 192 are connected through resistor 200 to conductor 110. The collector of transistor 190 is connected through resistor 202 to conductor 40 and is connected through resistor 204 and capacitor 206 in parallel to the base of transistor 192. The base of transistor 192 is also connected through resistor 208 to conductor 110. Capacitor 206 stabilizes the circuit during transition but has no effect when the circuit is in either of its two stable states. Output transistors 210 and 212 are a complementary pair isolated by large base resistors 214 and 216 from the basic trigger. These resistors are connected to the collector of transistor 192, which is also connected by resistor 218 to conductor 40. The emitter of NPN transistor 210 is connected to conductor 110, and the collector is connected through resistor 220 to conductor 40. The collector of transistor 212 is connected to conductor 110, and the emitter is connected through resistor 222 to conductor 40. Terminals A and B, connected to the collector of transistor 210 and the emitter of transistor 212, respectively, provide the complementary outputs.

Variable resistor 224 in series with fixed resistor 226 between the collector of transistor 210 and point 228 constitute a feedback circuit for controlling the hysteresis of the trigger circuit. In the untriggered state transistor 210 is normally non-conductive, and transistor 190 is substantially non-conductive. The potential at terminal A may be 12 volts, for example, and the potential at point 228 4 volts. A small current thus flows from terminal A toward point 228 tending to turn the trigger circuit ON. After the circuit has been triggered, the potential at terminal A drops almost to zero, and is thus less than the potential at point 228. The current through the feedback circuit thus flows in the opposite direction, tending to turn the trigger OFF. The feedback is thus always in a direction to assist changing the state of the trigger.

The hysteresis may be adjusted by means of resistor 224 to any appropriate value. For example, the adjustment may be such that after the trigger circuit is turned ON it will turn OFF when the temperature sensed by the thermocouple drops by 1° F.

Indicator circuit 20 is driven from the outputs of transistors 210 and 212. The collector of transistor 210 is connected through resistor 230 to the gate electrode of a silicon controlled rectifier 232. Similarly, the emitter of transistor 212 is connected through resistor 234 to the gate electrode of another SCR 236. Each gate electrode is connected through a resistor 238 to conductor 110 and to the cathode of the SCR. The anodes are connected through resistors 240 and indicator lamps 242 or 244 to conductor 246.

The silicon controlled rectifiers 232 and 236 are gated on alternately. When either of the silicon controlled rectifiers is in its high conductivity state, power is supplied to the corresponding lamp 242 or 244, so as to indicate the state of the output of the trigger circuit. Conductors 246 and 110 apply half of the AC voltage of the 30 volt secondary 30 to the lamps. Since AC is applied to the SCR's, even though the current through a lamp is greater than the holding current of the SCR the instantaneous reversal of voltage returns the SCR to its blocking state when the gating signal is removed, thus extinguishing the lamp. Lamp 242 is lit when the trigger circuit is OFF, and lamp 244 is lit when the trigger circuit is ON.

Figures 5, 6:
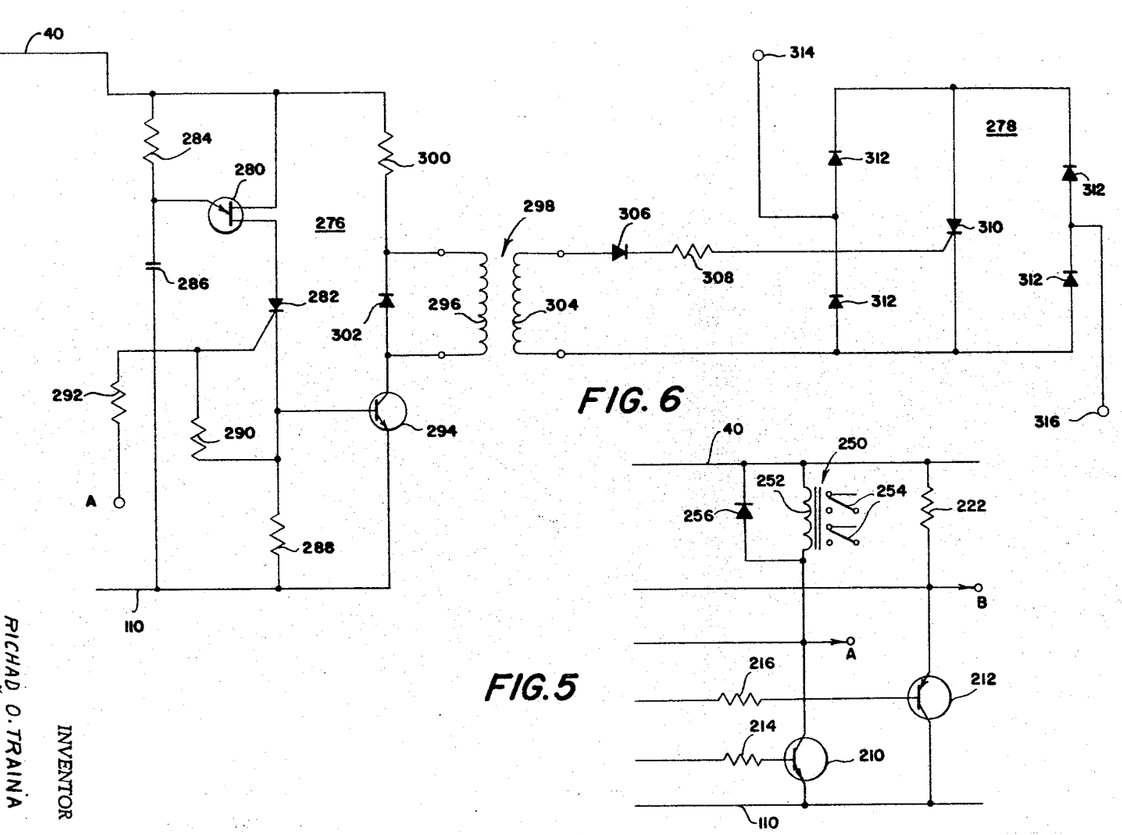
FIGURE 5 is a schematic diagram of an electromagnetic relay output circuit.
FIGURE 6 is a schematic diagram of an output circuit for controlling an AC load.

FIGURE 5 illustrates an output circuit which may be employed for operating an electromagnetic relay 250. As shown, this may be accomplished by substituting the coil 252 of the relay for resistor 220 of FIGURE 4. The relay has conventional contacts 254. The coil 252 is shunted by normally reverse-biased protective and stabilizing diode 256. The inherent isolation of the relay contacts provides output-control isolation.

When an all solid-state AC output is desired, the output circuit of FIGURE 6 may be employed. This circuit employs a unijunction oscillator 276 and an output switch 278. The unijunction device 280 has its base two connected to conductor 40 and its base one connected to the anode of an SCR 282. The emitter is connected to the junction of a timing resistor 284 and a timing capacitor 286 connected in series between conductors 40 and 110. The cathode of the SCR is connected through resistor 288 to conductor 110 and is connected through resistor 290 to the gate electrode. The gate electrode is connected through resistor 292 to input terminal A, for example. An NPN transistor 294 has its base connected to the cathode of SCR 282, its emitter connected to conductor 110, and its collector connected through the primary winding 296 of a pulse transformer 298 and a resistor 300 to conductor 40. A protective diode 302 is connected across the primary winding. One side of the secondary winding 304 is connected through a diode 306 and a resistor 308 to the gate electrode of an SCR 310, the cathode of which is connected to the other side of the secondary. This SCR is connected in the DC path of a bridge comprising diodes 312. AC is applied to the bridge at terminals 314 and 316, which may be connected in series with a load and a source of AC.

When the trigger circuit 14 of FIGURE 4 is switched so as to raise the potential at terminal A, SCR 282 conducts, permitting the unijunction oscillator to commence the generation of pulses. These pulses are applied by transformer 298 to the output switch 278. The pulse transformer provides output-control isolation. The pulses are applied to the gate of SCR 310 and switch the SCR to its high conductivity state, which permits power to flow through SCR 310 to turn if OFF. This opens the output returns to its state at which the potential at terminal A drops, SCR 282 returns to its blocking state, causing the unijunction oscillator to stop running and interrupting the train of pulses, so as to allow the reversal of current through SCR 310 to turn if OFF. This opens the output switch. The bridge of the output switch is preferably formed by using controlled avalanche rectifiers 312, which are inherently self-protecting against inductive load transients.

Figure 7:
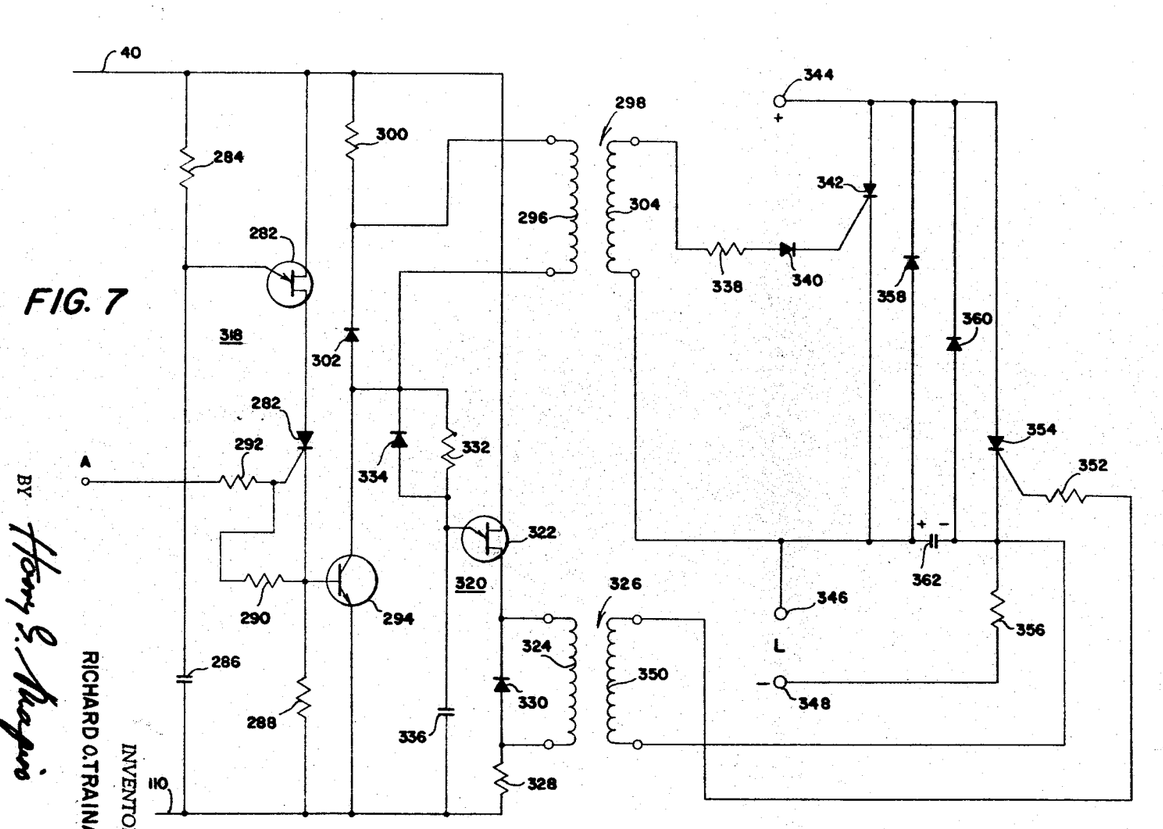
FIGURE 7 is a schematic diagram of an output circuit for controlling a DC load.

When an all solid-state DC output is desired, double unijunction oscillators and an output switch are employed. As shown in FIGURE 7 the dual oscillator comprises an ON oscillator 318 and an OFF oscillator 320. The ON oscillator comprises the same components illustrated in the oscillator of FIGURE 6. The OFF oscillator comprises a unijunction 322 having base two connected to conductor 40 and base one connected through primary winding 324 of pulse transformer 326 and a resistor 328 to conductor 110. The primary winding is bridged by a protective diode 330. The emitter of unijunction 322 is connected through a resistor 332 and a diode 334 in parallel to the collector of transistor 294. The emitter is also connected through a capacitor 336 to conductor 110.

One side of the secondary winding 304 is connected through a resistor 338 and a diode 340 to the gate of an SCR 342. The anode of the SCR is connected to a terminal 344, which is the positive terminal illustrated in FIGURE 2. The cathode is connected to the other side of the secondary winding 304 and to a terminal 346. Terminal 348 is the negative terminal shown in FIGURE 2. The load is connected between terminals 346 and 348.

Transformer 326 has a secondary winding 350, one side of which is connected through resistor 352 to the gate of SCR 354. The anode of SCR 354 is connected to terminal 344, and the cathode is connected to the other side of the secondary winding 350 and through a resistor 356 to terminal 348. Diodes 358 and 360 have their cathodes connected to terminal 344 and their anodes connected to the cathodes of the respective SCR's 342 and 354. A commutating capacitor 362 is connected between the cathodes of the SCR's.

When the switching of the trigger circuit 14 of FIGURE 4 raises the potential at terminal A, SCR 282 conducts, allowing oscillator 318 to run. The pulses from pulse transformer 298 render the ON SCR 342 conductive, supplying DC to the load across terminals 346 and 348. While oscillator 318 is running, the OFF oscillator 320 is restrained from running, because capacitor 336 is periodically discharged through transistor 294. When the trigger circuit 14 causes the potential at terminal A to drop, SCR 282 returns to its blocking state, causing transistor 294 to present a high impedance which prevents the discharging of capacitor 336. This allows the OFF oscillator 320 to run, providing pulses which are coupled by transformer 326 to render conductive the OFF SCR 354. Transformers 298 and 326 provide output-control isolation.

While the ON pulses are applied to the output switch and SCR 342 is conductive, capacitor 362 charges. When the ON pulses stop and the OFF pulses begin, turning ON SCR 354, the DC supply potential is placed in series with the commutating capacitor 362, momentarily reverse-biasing the ON SCR 342 and allowing it to turn OFF even though the load current is in excess of the SCR holding current. Diodes 358 and 360 prevent a momentary overload from being applied to the load.

The relay of the invention is made failsafe by means of a resistor 364 (FIGURE 2) connected in series with resistor 106 and the thermocouple terminals 104 between conductor 40 and conductor 110. If the thermocouple should fail, providing an open circuit across terminals 104, a sufficient voltage will appear across the input of the amplifier to cause the trigger circuit 14 to switch and to produce a response in the load circuit. Instead of resistor 364, a resistor may be connected across resistor 106 and terminals 104.

In addition to providing simply ON-OFF outputs, it is desired to provide outputs which permit proportioning of the ON-OFF time. Such outputs may be utilized, for example, to control the ratio of heating to cooling time of a heater over a given time interval. Thus, when it is desired to control temperature, not merely to monitor it, heat may be applied in variable width pulses, rather than larged fixed quantities, so that as the relay of the invention approaches its trip point, the size of the heat pulses controlled by the relay may be reduced to minimize temperature overshoots and fluctuations.

Two modes of time proportioning control are desirable: first, control of cycle rate, which determines the length of time proportioning cycle, and second control of the proportional bandwidth, which determines how far from the trip point proprotioning action begins. Cycle rate control permits the "tuning" of the controller to a load to which heat is applied, by applying heat more frequently to a load which loses heat quickly and less frequently to a load which retains its heat. Proportional bandwidth control minimizes temperature overshoots or unduly long heating time. If the proportional band is too small, the load will overshoot, because heat in large quantities will be supplied to the load until its rate of temperature increase cannot be slowed fast enough to prevent overshoot. If the band is too wide, the load will take a very long time to reach the desired temperature and will have very little ability to correct for changes in the thermal mass of the load.

Figure 8:
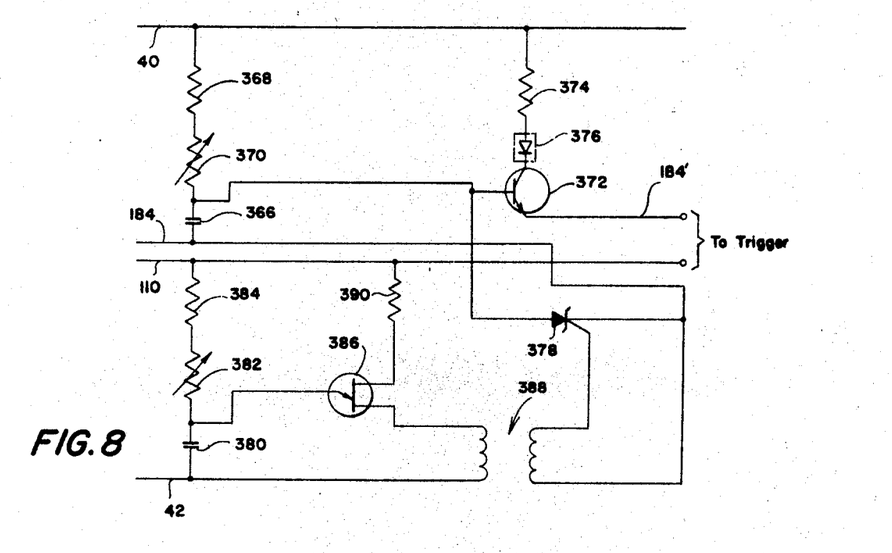
FIGURE 8 is a schematic diagram of a time proportioning circuit.

Time proportioning may be accomplished in accordance with the invention by employing a circuit of the type shown in FIGURE 8 between the output of the setpoint level adjustment circuit and the input of the trigger circuit. Time proportioning operation is provided by adding a time variable or time cycled third voltage component to the two components at the output of the setpoint level adjustment circuit and is, to the signal component and the reference component.

To provide the time variable component capacitor 366 is charged through fixed resistor 368 and variable resistor 370. The time-dependent voltage across the capacitor is added to the voltage at conductor 184 connected to the output of the setpoint level adjustment circuit. The sum is applied, without further change, to the input of the trigger circuit by emitter follower transistor 372, which has as its collector load resistor 374 and stabistor 376, and its emitter connected to conductor 184'.

Resistor 370 controls the proportional bandwidth. If its resistance is low, capacitor 366 can charge to a relatively high voltage in a given length of time, thus requiring less setpoint or signal voltage to reach the trip level of the trigger circuit. Low signal or setpoint voltage corresponds to a temperature very far below the trip point of the trigger circuit, thus creating a wide band during which proportioning action is effective. Conversely, if the resistance of variable resistor 370 is high, capacitor 366 can charge only to a relaively low value in the same length of time, thus requiring higher setpoint and/or signal voltage to reach the trigger circuit trip level. High signal and/or setpoint voltage corresponds to a temperature near the trip point of the trigger circuit, thus creating a narrow band during which proportioning action is effective.

The voltage across capactor 366 is time cycled, because the capacitor is periodically discharged by switching on a silicon controlled rectifier 378, which is connected across the capacitor. The rate at which SCR turns ON is controlled by a unijunction relaxation oscillator comprising capacitor 380. The voltage level across capacitor 380, and its rate of charge, is controlled by variable resistor 382 in series with resistor 384. When the voltage across capacitor 380 reaches the peak voltage of unijunction 386, the unijunction fires, discharging capacitor 380 through the primary of a pulse transformer 388. After the capacitor 380 has been discharged, the unijunction turns OFF, allowing capacitor 380 to charge again, thereby to repeat the cycle. Resistor 390 in the base two circuit of the unijunction stabilizes the timing period over ambient temperature extremes.

The unijunction discharge pulse is electrically isolated from, but magnetically coupled to the secondary of pulse transformer 388, where it is applied to the gate electrode of the SCR. The silicon controlled rectifier stays in its conducting state even after the triggering pulse is finished, because the discharge current of capacitor 366 is higher than the holding current of the SCR. The silicon controlled rectifier returns to its blocking state when capacitor 366 is no longer able to supply current above the holding current.

Variable resistor 382 controls the cycle rate. When the resistance is low, capacitor 380 charges to unijunction peak voltage faster, thus creating a shorter cycle. Conversely, when the resistance is high, the capacitor charges to the unijunction peak voltage more slowly, thus giving a longer cycle.

Figure 9:
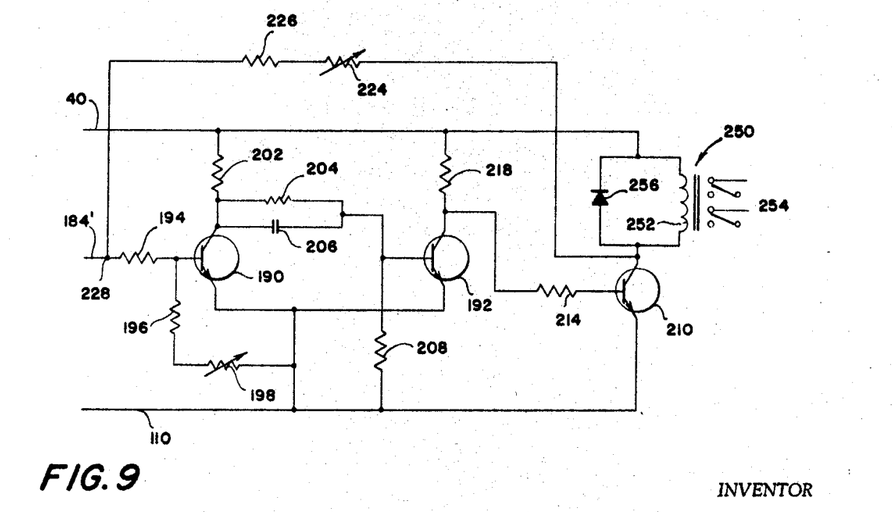
FIGURE 9 is a schmatic diagram of a modified trigger circuit for use with the circuit of FIGURE 8.

The trigger circuit of FIGURE 9 is preferred for use with the time proportioning circuit of FIGURE 8. The circuit of FIGURE 9 is basically similar to the trigger circuit of FIGURE 4 and uses the relay output circuit of FIGURE 5. Emitter resistor 200 of FIGURE 4 is omitted. The trip level of the circuit of FIGURE 9 is set at five volts DC, for example, compared to four volts in FIGURE 4, in order partially to compensate for the voltage which must always remain across capacitor 366 of FIGURE 8 due to the inherent forward voltage drop of SCR 378, which may be approximately 1.2 volts DC.

Since the identification and the values of certain components may be of interest, they are specified as follows:

In FIGURE 2 resistor 58 may be 1K, resistor 70 100 ohms, resistors 74, 76 and 82 20 ohms ±1%, resistor 78 22 ohms ±.1%, and resistor 84 30 ohms ±1%. Resistor 364 may be 820K and resistor 106 75 ohms. Transistor 36 may be a 2N497 and transistor 38 a 2N1131. In FIGURE 2A, resistor 94 may be 27K and bulbs 92 type NE–2H. In FIGURE 3 resistor 112 may be 510 ohms, and potentiometer 114 1000 ohms. Resistor 116 may be 7500 ohms, capacitor 118 4 microfarads, and capacitor 120 20 microfarads. Transistors 122 and 124 may be type 2N3395, transistors 126 and 182 type SS–102 and transistors 168 and 172 type 2N3395. In FIGURE 4, SCR's 232 and 236 may be type 2N1595, transistors 190, 192, and 210 type 2N2714, and transistor 212 type SS–102. In FIGURE 6, SCR 282 may be type 2N1595. In FIGURE 7, SCR 282 may be type 2N1595, unijunctions 282 and 322 type 2N1671A, transistors 294 type 2N2714, and SCR's 342 and 354 type 2N1596. Capacitor 362 may be 1 microfarad and resistor 356 10K.

While preferred embodiments of the invention have been shown and described, it will be apparent to those skilled in the art that changes can be made in these embodiments, without departing from the principles and spirit of the invention, the scope of which is defined in the appended claims. Accordingly, the foregoing embodiments are to be considered illustrative, rather than restrictive of the invention, and those modifications which come within the meaning and range of equivalency of the claims are to be included therein.

The invention claimed is:

1. Setpoint level adjustment apparatus of the type described, comprising a pair of complementary transistors having their collector-emitter paths connected in series, means for applying a signal to the base of one of said transistors, means for applying an adjustable reference potential to the base of the other of said transistors, said reference potential being derived from a source comprising a further transistor having its emitter in series with diode means and a voltage divider connected across the path including the base-emitter junction of said further transistor and said diode means in series, and means for deriving an output across said pair of complementary transistors in series.

2. The apparatus of claim 1, said voltage divider comprising a potentiometer having a tap connected to the base of said other transistor.

3. The apparatus of claim 1, said diode means comprising a stabistor.

4. A trigger circuit comprising a pair of transistors, means connecting the emitters of said transistors to one power supply terminal, means connecting the collectors of said transistors to another power supply terminal, a resistor and a capacitor in parallel connecting the collector of one of said transistors to the base of the other, a resistor connecting said base to said one terminal, a resistor connecting the base of said one transistor to its emitter, a further transistor having its emitter connected to said one terminal, and having means connecting its base to the collector of said other transistor, impedance means connecting the collector of said other transistor to said second terminal, a signal input conductor, a resistor connecting said signal input conductor to the base of said one transistor, and a feedback circuit including a resistor connected between said conductor and the collector of said further transistor.

5. A unijunction oscillator circuit comprising a unijunction device, a controlled rectifier, and a transistor, a base of said device being connected to a first power supply terminal, another base of said device being connected to the anode of said rectifier, a resistor connecting the cathode of said rectifier to a second power supply terminal, the base of said transistor being connected to the cathode of said rectifier and the emitter of said transistor being connected to said second terminal, load means connecting the collector of said transistor to said first terminal, a resistor connected between the gate electrode of said rectifier and its cathode, and a resistor and a capacitor connected in series between said terminals, the emitter of said device being connected to the junction of the last-mentioned resistor and capacitor.

6. The apparatus of claim 5, said load means comprising a transformer having a primary winding and a secondary winding, said primary winding being connected to said collector, and a rectifier bridge having a pair of AC terminals and having a DC path including another controlled rectifier, said other controlled rectifier having a gate electrode connected to said secondary winding.

7. The circuit of claim 5, further comprising a second unijunction device having a base connected to said one terminal, second load means connecting another base of the last-mentioned device to said second terminal, a resistor and a capacitor connected in series between the collector of said transistor and its emitter, the emitter of said second unijunction device being connected to the junction of the last-mentioned resistor and capacitor, and a diode connecting the last-mentioned junction to the collector of said transistor and poled to discharge the last-mentioned capacitor when said transistor is conductive.

8. Apparatus of the type described comprising first, second, and third terminals, said first and third terminals being adapted for connection to a source of DC, said second and third terminals being adapted for connection to a load, a first controlled rectifier having its anode connected to said first terminal and its cathode connected to said second terminal, a capacitor, a second controlled rectifier having its anode connected to said first terminal and its cathode connected to one side of said capacitor, the other side of said capacitor being connected to the cathode of said first controlled rectifier, a resistor connecting said third terminal to the cathode of said second controlled rectifier, a pair of diodes having their anodes connected, respectively, to the cathodes of said controlled rectifiers and their cathodes connected to the anodes of said controlled rectifiers, and means for applying alternate gate signals to the gate electrodes of said controlled rectifiers.

9. Relay apparatus of the type described, comprising DC amplifier means, means for applying an input signal to said amplifier means, means for adding an adjustable reference potential and a time-cycled potential to the output of said amplifier means to produce a sum signal, bistable trigger means, means for applying said sum signal to the input of said trigger means, and output means responsive to said trigger means.

10. Relay apparatus of the type described, comprising amplifier means, means for applying an input signal to said amplifier means, means for adding an adjustable reference potential to the output of said amplifier means to produce a sum signal, trigger means, means for applying said sum signal to the input of said trigger means, and output means responsive to said trigger means, said adding means comprising a setpoint level adjustment circuit having a pair of variable impedances in series, one of said impedances being responsive to the output of said amplifier means, and the other of said impedances being responsive to an adjustable source of D.C. potential, the output of said circuit being responsive to the impedance of said variable impedances in series.

11. Relay apparatus of the type described, comprising amplifier means, means for applying an input signal to said amplifier means, means for adding an adjustable reference potential to the output of said amplifier means to produce a sum signal, trigger means, means for applying said sum signal to the input of said trigger means, and output means responsive to said trigger means, said output means comprising oscillator means operable in response to said trigger means, a rectifier bridge having a pair of AC terminals and having a DC path including a controlled rectifier device, and a transformer for coupling the output of said oscillator means to the control electrode of said device.

12. Relay apparatus of the type described, comprising amplifier means, means for applying an input signal to said amplifier means, means for adding an adjustable reference potential to the output of said amplifier means to produce a sum signal, trigger means, means for applying said sum signal to the input of said trigger means, and output means responsive to said trigger means, said output means comprising first oscillator means operable in response to said trigger means, second oscillator means, means for rendering said second oscillator means operative when said first oscillator means is inoperative and for rendering said second oscillator means inoperative when said first oscillator means is operative, output switch means, means for closing said output switch means in response to the oscillations from said first oscillator means, and means for opening said output switch means in response to the oscillations from said second oscillator means.

13. Trigger apparatus of the type described, comprising a pair of transistors connected in a bistable circuit having feedback means for controlling the hysteresis of said circuit, a pair of complementary transistors having input electrodes connected to an output electrode of one of the first-mentioned pair of transistors, a pair of indicator means, and means connected to an output electrode of each of said complementary transistors for controlling said indicator means, respectively.

14. Relay apparatus of the type described, comprising D.C. amplifier means, means for applying an input signal to said amplifier means, a set-point level adjustment circuit having means for adding a stable adjustable D.C. set-point reference potential to the signal output of said amplifier means, without substantial variation of the magnitude of said signal output, to produce a sum signal, trigger means having a predetermined input threshold which must be exceeded by said sum signal to actuate said trigger means from one stable state to another stable state in which said trigger means remains as long as said threshold is exceeded, means for applying said sum signal to the input of said trigger means, and output means responsive to the actuation of said trigger means by said sum signal.

15. Relay apparatus in accordance with claim 14 and further comprising means for indicating the difference between said sum signal and said threshold level.

16. Relay apparatus in accordance with claim 14, said trigger means having means including a feedback path for controlling the hysteresis of said trigger means.

17. Relay apparatus as set forth in claim 14, said set-point level adjustment circuit comprising a pair of transistors of complementary type having their collector-emitter paths connected in series, means for applying said signal output of said amplifier means to the base of one of said transistors, means for applying said reference potential to the base of said other transistor, and means for deriving said sum signal across said collector-emitter paths in series.

18. Relay apparatus of the type described, comprising D.C. amplifier means, means for applying an input signal to said amplifier means, means for adding an adjustable reference potential to the output of said amplifier means to produce a sum signal, trigger means, means for applying said sum signal to the input of said trigger means, and output means responsive to said trigger means, said D.C. amplifier means having means at its input for chopping said input signal and having means at its output for demodulating the chopped signal, said demodulating means comprising a first diode, a second diode, and a filter, means for connecting one electrode of said first diode to a source of reference potential, means for connecting the corresponding electrode of the second diode to the other electrode of the first diode, means connecting said filter between the other electrode of said second diode and said source of reference potential, means for applying a signal to be demodulated to said other electrode of said first diode, and means for deriving an output from said other electrode of said second diode.

19. Trigger apparatus of the type described, comprising a pair of transistors and means interconnecting them to form a bistable trigger circuit, said apparatus having, in addition, feedback means for controlling the hysteresis of said circuit.

20. The apparatus of claim 19, said feedback means being connected to urge said circuit to switch to its alternate state regardless of which state it is in.

21. The apparatus of claim 19, said feedback means comprising an adjustable impedance.

22. Apparatus of the type described, comprising a pair of oscillators, means for causing one of said oscillators to operate in response to an external signal, and means for preventing the other of said oscillators from operating when said one oscilator is operating and for causing the other of said oscillators to operate when said one oscillator is not operating, said other oscillator having a timing capacitor, said means for preventing said other oscillator from operating comprising means responsive to the operation of said one oscillator for discharging said timing capacitor.

23. The apparatus of claim 22, further comprising load circuit switching means, means for closing said switching means in response to the operation of said one oscillator, and means for opening said switching means in response to the operation of said other oscillator.

24. Relay apparatus of the type described, comprising D.C. amplifier means, means for applying an input signal to said amplifier means, means for adding an adjustable reference potential and a time-cycled potential to the signal output of said amplifier means to produce a sum signal, trigger means having a predetermined input threshold which must be exceeded by said sum signal to actuate said trigger means from one stable state to another stable state in which said trigger means remains as long as said threshold is exceeded, means for applying said sum signal to the input of said trigger means, and output means responsive to the actuation of said trigger means by said sum signal.

25. Relay apparatus in accordance with claim 24, further comprising means for controlling the length of the cycle of said time-cycled potential.

26. Relay apparatus in accordance with claim 24, further comprising means for controlling the amplitude of said time-cycle potential.

References Cited

UNITED STATES PATENTS

| | | |
|---|---|---|
| 3,097,307 | 7/1963 | Bonn. |
| 3,237,058 | 2/1966 | Andregg. |
| 2,708,721 | 5/1955 | Ziffer _____________ 330—10 X |
| 2,762,005 | 9/1956 | Harvey et al. ________ 318—327 |
| 2,778,978 | 1/1957 | Drew. |
| 2,887,642 | 5/1959 | Ehret et al. ______ 318—20.750 |
| 2,888,579 | 5/1959 | Wanlass ___________ 307—88.5 |
| 2,904,734 | 9/1959 | Paschkis _________ 318—20.750 |
| 2,964,656 | 12/1960 | Bissell et al. ________ 307—88.5 |
| 3,107,320 | 10/1963 | Brittain et al. |
| 3,069,558 | 12/1962 | Burt et al. |
| 3,109,943 | 11/1963 | Merlen. |
| 3,149,243 | 9/1964 | Garfield. |
| 3,155,920 | 11/1964 | Wells _______________ 331—56 |
| 3,175,211 | 3/1965 | Lee et al. __________ 307—88.5 |
| 3,209,211 | 9/1965 | Du Vivier _______ 317—148.5 X |
| 3,235,860 | 2/1966 | Vassil _____________ 307—88.5 |
| 3,241,779 | 3/1966 | Bray et al. ______ 317—148.5 X |
| 3,277,316 | 10/1966 | Van Meines _______ 331—49 X |
| 3,295,421 | 1/1967 | McCormick _____ 317—148.5 X |

LEE T. HIX, *Primary Examiner.*

U.S. Cl. X.R.

307—255, 274, 290, 296, 301; 317—132, 148.5, 153; 329—203; 321—18; 330—10, 147; 331—49, 56, 111

UNITED STATES PATENT OFFICE
CERTIFICATE OF CORRECTION

Patent No. 3,445,683 May 20, 1969

Richard O. Traina

It is certified that error appears in the above identified patent and that said Letters Patent are hereby corrected as shown below:

Column 1, line 43, "exceptionally" should read -- exceptional --. Column 2, line 26, "schmatic" should read -- schematic --; line 32, "The" should read -- This --; line 60, "the" should read -- a --. Column 6, line 37, "SCR 310 to turn it OFF. This opens the output" should read -- the bridge and the load. When trigger circuit 14 --. Column 7, line 45, before "larged" insert -- in --; line 51, before "time" insert -- the --; same line 51, after "second" insert a comma; line 74, "and", first occurrence, should read -- that --. Column 8, line 28, after "which" insert -- the --; line 51, after "to" insert -- the --.

Signed and sealed this 11th day of August 1970.

(SEAL)
Attest:

EDWARD M.FLETCHER,JR.
Attesting Officer

WILLIAM E. SCHUYLER, JR.
Commissioner of Patents